(12) United States Patent
Gilbert et al.

(10) Patent No.: US 9,993,772 B2
(45) Date of Patent: Jun. 12, 2018

(54) ZONED EXHAUST SYSTEM

(71) Applicant: Johnson Matthey Public Limited Company, London (GB)

(72) Inventors: Lee Gilbert, Royston (GB); Colin Newman, Royston (GB); Andrew Newman, Royston (GB); Mikael Larsson, Gothenburg (SE)

(73) Assignee: Johnson Matthey Public Limited Company, London (GB)

( * ) Notice: Subject to any disclaimer, the term of this patent is extended or adjusted under 35 U.S.C. 154(b) by 0 days. days.

(21) Appl. No.: 15/183,824

(22) Filed: Jun. 16, 2016

(65) Prior Publication Data

US 2016/0367941 A1 Dec. 22, 2016

Related U.S. Application Data

(60) Provisional application No. 62/181,598, filed on Jun. 18, 2015, provisional application No. 62/181,268, filed on Jun. 18, 2015.

(51) Int. Cl.
*B01J 21/04* (2006.01)
*B01J 23/40* (2006.01)
(Continued)

(52) U.S. Cl.
CPC ..... *B01D 53/9468* (2013.01); *B01D 53/9418* (2013.01); *B01D 53/9436* (2013.01); *B01D 53/9472* (2013.01); *F01N 3/106* (2013.01); *F01N 3/2066* (2013.01); *B01D 53/944* (2013.01); *B01D 2255/9022* (2013.01); *B01D 2255/9025* (2013.01); *B01D 2255/9032* (2013.01); *B01D 2255/9035* (2013.01);
(Continued)

(58) Field of Classification Search
CPC ... B01J 21/04; B01J 23/40; B01J 23/42; B01J 23/44; B01J 23/72; B01J 23/745; B01J 29/763; B01J 35/04; B01D 53/9418; B01D 53/9436; B01D 53/944; B01D 53/9472; F01N 3/106; F01N 3/2066; F01N 3/2828
See application file for complete search history.

(56) References Cited

U.S. PATENT DOCUMENTS 4,010,238 A 3/1977 Shiraishi et al.
4,085,193 A 4/1978 Nakajima et al.
(Continued)

FOREIGN PATENT DOCUMENTS

DE 102012209852 A1 12/2012

*Primary Examiner* — Cam N. Nguyen

(57) ABSTRACT

A catalytic article having a flow-through substrate having an inlet, an outlet, and an axial length; an SCR zone containing a first SCR catalyst; and an oxidation zone containing (a) an ASC zone and a DOC zone or (b) a mixed ASC and DOC zone, where the oxidation zone contains an ammonia oxidation catalyst and a DOC catalyst, the SCR zone is positioned on the substrate from the inlet end and extends less than the axial length of the substrate from the inlet, the DOC zone or the mixed ASC and DOC zone is position on the substrate from the outlet end, and when the DOC zone is present, the ASC zone is located between the SCR zone and the DOC zone. In other catalytic articles, the ASC zone further comprises a DEC catalyst. Methods of using the catalytic articles in an SCR process, where the amount of ammonia slip is reduced, are also described.

17 Claims, 8 Drawing Sheets

(51) Int. Cl.

| | | |
|---|---|---|
| *B01J 23/42* | (2006.01) | |
| *B01J 23/44* | (2006.01) | |
| *B01J 23/72* | (2006.01) | |
| *B01J 23/745* | (2006.01) | |
| *B01J 29/76* | (2006.01) | |
| *B01J 35/04* | (2006.01) | |
| *B01D 53/94* | (2006.01) | |
| *F01N 3/10* | (2006.01) | |
| *F01N 3/20* | (2006.01) | |
| *F01N 3/28* | (2006.01) | |
| *F01N 13/00* | (2010.01) | |

(52) U.S. Cl.
CPC ........ *F01N 13/009* (2014.06); *F01N 13/0097* (2014.06); *F01N 2330/06* (2013.01); *F01N 2510/063* (2013.01); *F01N 2510/0682* (2013.01); *F01N 2510/0684* (2013.01); *F01N 2570/10* (2013.01); *F01N 2570/12* (2013.01); *F01N 2570/14* (2013.01); *F01N 2570/18* (2013.01); *F01N 2610/02* (2013.01); *F01N 2900/1616* (2013.01); *Y02T 10/24* (2013.01)

(56) References Cited

U.S. PATENT DOCUMENTS

| | | | | |
|---|---|---|---|---|
| 7,481,983 | B2 * | 1/2009 | Patchett | B01D 53/9418 422/177 |
| 8,637,426 | B2 * | 1/2014 | Hoke | B01D 53/945 502/333 |
| 8,789,356 | B2 * | 7/2014 | Phillips | B01D 53/9418 60/274 |
| 9,242,212 | B2 * | 1/2016 | Phillips | B01D 53/9418 |
| 9,527,031 | B2 * | 12/2016 | Chandler | B01D 53/94 |
| 2009/0288402 | A1 * | 11/2009 | Voss | B01D 53/9418 60/299 |
| 2010/0111796 | A1 | 5/2010 | Caudle et al. | |
| 2010/0175372 | A1 | 7/2010 | Lambert et al. | |
| 2011/0271664 | A1 | 11/2011 | Boorse et al. | |
| 2011/0286900 | A1 * | 11/2011 | Caudle | B01D 53/9436 423/213.5 |
| 2012/0247092 | A1 | 10/2012 | Boorse | |
| 2014/0154163 | A1 * | 6/2014 | Andersen | B01J 37/0244 423/237 |
| 2014/0212350 | A1 * | 7/2014 | Andersen | B01J 23/6527 423/237 |
| 2014/0219879 | A1 * | 8/2014 | Bull | B01D 53/9418 422/170 |
| 2015/0151288 | A1 * | 6/2015 | Rivas-Cardona | B01J 37/0225 423/700 |
| 2016/0008759 | A1 * | 1/2016 | Sonntag | B01J 35/04 423/239.1 |
| 2016/0038878 | A1 * | 2/2016 | Sonntag | B01J 35/0006 423/213.5 |
| 2016/0045868 | A1 * | 2/2016 | Sonntag | B01J 35/0006 423/213.2 |
| 2016/0367973 | A1 * | 12/2016 | Larsson | B01J 29/763 |

* cited by examiner

ZONED EXHAUST SYSTEM

CROSS-REFERENCE TO RELATED APPLICATIONS

This application claims priority to U.S. Provisional Patent Application No. 62/181,598 and U.S. Provisional Patent Application No. 62/181,268, both filed Jun. 18, 2015, the disclosures of which are incorporated herein by reference in their entireties for all purposes.

FIELD OF THE INVENTION

The invention relates to a substrate that is zoned to provide combined SCR, ammonia slip catalyst (ASC) and diesel oxidation catalyst (DOC) or diesel exotherm catalyst (DEC) activity.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from NOx in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide byproducts are formed.

SUMMARY OF THE INVENTION

In a first aspect, the invention relates to a catalyst article comprising a substrate comprising an inlet and an outlet, a first zone comprising a first SCR catalyst and a second zone comprising a diesel oxidation catalyst (DOC), where the first zone is located on the inlet side of the substrate and the second zone is located in the outlet side of the substrate. The catalyst article can further comprise a third zone comprising an ammonia slip catalyst (ASC), where the third zone is located between the first zone and the second zone. The ammonia slip catalyst (ASC) comprises (a) a first SCR catalyst or a second SCR catalyst and (b) an ammonia oxidation catalyst. The catalyst article can provide a very fast response to urea or ammonia in the first zone. The catalyst article can have very low $NH_3$ storage in the first zone.

In a second aspect, the invention relates to a catalyst article comprising a substrate comprising an inlet and an outlet, a first zone comprising a first SCR catalyst and a second zone comprising an ammonia slip catalyst (ASC), where the first zone is located on the inlet side of the substrate and the second zone is located immediately downstream of the first zone. The ammonia slip catalyst (ASC) can comprise (a) a first SCR catalyst or a second SCR catalyst and (b) an ammonia oxidation catalyst. The catalyst article can provide a very fast response to urea or ammonia in the first zone. The catalyst article can have very low $NH_3$ storage in the first zone.

In another aspect, the invention relates to exhaust systems comprising a catalytic article of the first aspect of the invention and a means for introducing $NH_3$ into, or forming $NH_3$ in, the exhaust gas, where the means for introducing $NH_3$ into or forming $NH_3$ in the exhaust gas is located before the catalytic article.

In yet another aspect, the invention relates to a combustion source comprising an exhaust system comprising a catalyst article of the first aspect of the invention and a means for introducing $NH_3$ into the exhaust gas or forming $NH_3$ in the exhaust gas where the means for introducing $NH_3$ into the exhaust gas or forming $NH_3$ in the exhaust gas is located before the catalytic article.

In still another aspect, the invention relates to a method of reducing $N_2O$ formation from $NH_3$ in an exhaust gas, where the method comprises contacting an exhaust gas comprising ammonia with a catalyst article of the first aspect of the invention.

In another aspect, the invention relates to a method of reducing NOx formation in an exhaust gas, where the method comprises contacting an exhaust gas comprising ammonia with a catalyst article of the first aspect of the invention.

In yet another aspect, the invention relates to a method of reducing hydrocarbon formation in an exhaust gas, where the method comprises contacting an exhaust gas comprising a hydrocarbon with a catalyst article of the first aspect of the invention.

In another aspect, the invention relates to a catalytic article comprising a flow-through substrate having an inlet, an outlet, and an axial length; an SCR zone comprising a first SCR catalyst; and an oxidation zone comprising: (a) an ASC zone and a DOC zone or (b) a mixed ASC and DOC zone, where the oxidation zone comprises an ammonia oxidation catalyst and a DOC catalyst, the SCR zone is positioned on the substrate from the inlet end and extends less than the axial length of the substrate from the inlet, the DOC zone or the mixed ASC and DOC zone is position on the substrate from the outlet end, and when the DOC zone is present, the ASC zone is located between the SCR zone and the DOC zone. The catalytic article can further comprise a second SCR catalyst, where the second SCR catalyst is located in the oxidation zone. In some configurations, a portion of the first SCR catalyst can cover all or a portion of the second SCR catalyst. In other configurations, a portion of the second SCR catalyst can cover all or a portion of the first SCR catalyst. The first and second SCR catalysts can differ by comprising a different ingredient, by having a different catalyst loading, or both. The DOC can be a DEC. The oxidation zone can comprise a combined ASC/DOC zone comprising an ammonia oxidation catalyst and a DOC catalyst, where the SCR zone extends from the inlet and covers a portion of the combined ASC/DOC zone, the combined ASC/DOC zone extends less than the axial length from the outlet. The DOC catalyst can generate an exotherm and can generate $NO_2$ for passive regeneration of a downstream filter.

In another aspect, the invention relates to an exhaust system comprising the catalytic article of the first aspect of the invention and a means for forming $NH_3$ in the exhaust gas or introducing $NH_3$ into the exhaust gas.

In still another aspect, the invention relates to a method of providing low temperature NOx control coupled with good ASC selectivity and DOC capability in the exhaust from a diesel engine, where the method comprises contacting an exhaust gas from the engine with a catalyst article of the first aspect of the invention.

DETAILED DESCRIPTION OF THE INVENTION

Figure 1:
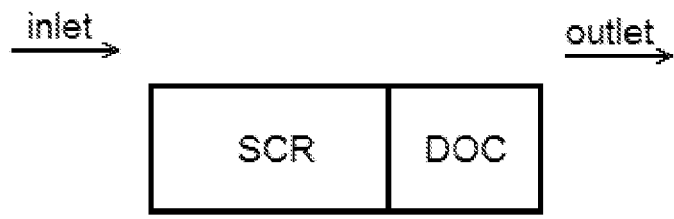
FIG. 1 depicts a configuration in which a first SCR catalyst is positioned in the exhaust gas flow before a DOC.

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "ammonia slip" means the amount of unreacted ammonia that passes through the SCR catalyst.

The term "support" means the material to which a catalyst is fixed.

The term "a support with low ammonia storage" means a support that stores less than 0.001 mmol $NH_3$ per $m^3$ of support. The support with low ammonia storage is preferably a zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, -IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the molecular sieve or zeolite has a framework type selected from the group consisting of BEA, CDO, CON, FAU, MEL, MFI and MWW, even more preferably the framework type is selected from the group consisting of BEA and MFI.

The term "calcine" or "calcination" means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "ASC selectivity" means the percent conversion of NOx. High ASC selectivity means that the percent conversion of ammonia to nitrogen is maximized, while the conversion of ammonia to NOx and $N_2O$ is minimized. The goal is to have less than 30% $N_2O$ selectivity and less than 30% NOx selectivity at temperatures between 250° C. and 500° C. when tested in a gas containing 500 ppm $NH_3$ and 12% $O_2$ at 150K SV.

The term "platinum group metal" or "PGM" refers to platinum, palladium, ruthenium, rhodium, osmium and iridium. The platinum group metals are preferably platinum, palladium, ruthenium or rhodium.

The term "DOC" means a diesel oxidation catalyst, which is designed to oxidize CO, hydrocarbons and organic matter in diesel particulates to carbon dioxide and water. As used herein, the term includes a DEC (Diesel Exotherm Catalyst) with creates an exotherm.

The term "axial length" is the length between the inlet end and the outlet end.

The term "fast response" means that a catalyst achieves 90% of its maximum possible conversion in 500 ppm NO and 750 ppm $NH_3$ at an $NH_3$ fill level of <0.5 g/L, preferably <0.4 g/L, more preferably <0.3 g/L.

The term "active component loading" refers to the weight of the support of platinum+the weight of platinum+the weight of the first SCR catalyst in the blend. Platinum can be present in the catalyst in an active component loading from about 0.01 to about 0.25 wt. %, inclusive. Preferably, platinum can present in the catalyst in an active component loading from 0.04 to 0.2 wt. %, inclusive. More preferably, platinum can be present in the catalyst in an active component loading from 0.07 to 0.17 wt. %, inclusive. Most preferably, platinum can be present in the catalyst in an active component loading from 0.05 to 0.15 wt. %, inclusive.

In the first aspect of the invention, a catalytic article comprises a flow-through substrate having an inlet, an outlet, and an axial length; an SCR zone comprising a first SCR catalyst; and an oxidation zone comprising: (a) an ASC zone and a DOC zone or (b) a mixed ASC and DOC zone, where the oxidation zone comprises an ammonia oxidation catalyst and a DOC catalyst, the SCR zone is positioned on the substrate from the inlet end and extends less than the axial length of the substrate from the inlet, the DOC zone or the mixed ASC and DOC zone is position on the substrate from the outlet end, and when the DOC zone is present, the ASC zone is located between the SCR zone and the DOC zone.

Various configurations of catalysts in the catalytic article are provided.

In a configuration, a catalyst article comprises a substrate having an inlet and an outlet, a first zone comprising an SCR catalyst and a second zone comprising a diesel oxidation catalyst, where the SCR is positioned at the inlet of the substrate within the exhaust gas flow and the DOC is positioned at the outlet of the substrate. (See FIG. 1).

Figure 2:
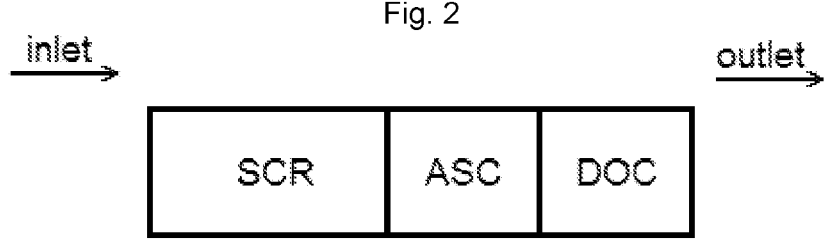
FIG. 2 depicts a generic configuration in which a first SCR catalyst is positioned in the exhaust gas flow before an ASC and a DOC is located downstream of the ASC.

In another configuration, a catalyst article comprises a substrate having an inlet and an outlet, a first zone comprising an SCR catalyst, a second zone comprising an ammonia slip catalyst (ASC) and a third zone comprising a diesel oxidation catalyst. FIG. 2 depicts a configuration in which the SCR is positioned at the inlet of the substrate within the exhaust gas flow, the ASC is positioned downstream of the SCR catalyst and the DOC is positioned downstream of the ASC at the outlet of the substrate.

Figure 3:
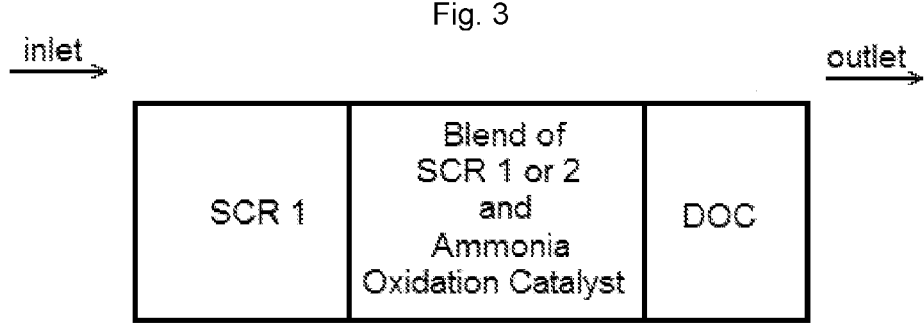
FIG. 3 depicts a configuration in which a first SCR catalyst is positioned in the exhaust gas flow before an ASC and a DOC is located downstream of the ASC and the ASC is a blend of an SCR and an oxidation catalyst.

In another configuration, a catalyst article comprises a substrate having an inlet and an outlet, a first zone comprising an SCR catalyst, a second zone comprising an ammonia slip catalyst (ASC) comprising a blend of a first or second SCR catalyst and an ammonia oxidation catalyst, and a third zone comprising a diesel oxidation catalyst. FIG. 3 depicts a configuration in which the ASC is a blend of an SCR catalyst and platinum on a support with low ammonia storage. The overall configuration is as described in FIG. 2.

Figure 4:
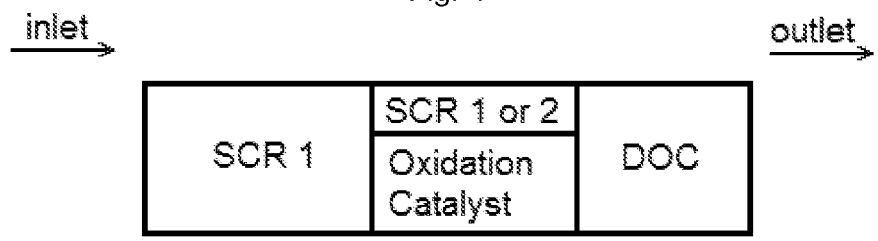
FIG. 4 depicts a configuration in which a first SCR catalyst is positioned in the exhaust gas flow before an ASC and a DOC is located downstream of the ASC, and the ASC is a bi-layer with a bottom layer comprising an oxidation catalyst and the top layer comprises an SCR catalyst.

In another configuration, a catalyst article comprises a substrate having an inlet and an outlet, a first zone comprising an SCR catalyst, a second zone comprising an ammonia slip catalyst (ASC) comprising bi-layer with a bottom layer comprising an ammonia oxidation catalyst and a top layer comprising a first or second SCR catalyst, and a third zone comprising a diesel oxidation catalyst. FIG. 4 depicts a configuration in which the ASC is a bi-layer with a bottom layer comprising an ammonia oxidation catalyst and a top layer comprising a first or second SCR catalyst. The overall configuration is as described in FIG. 2.

Figure 5:
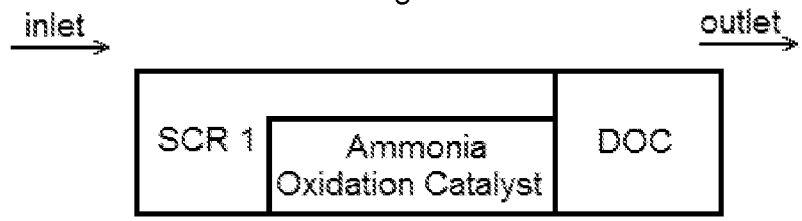
FIG. 5 depicts a configuration in which a first SCR catalyst is positioned in the exhaust gas flow before an ASC and a DOC is located downstream of the ASC and the ASC is a bi-layer in which a portion of the first SCR catalyst is also present in the top layer over the bottom layer comprising an oxidation catalyst.

In another configuration, a catalyst article comprises a substrate having an inlet and an outlet, a first zone comprising an SCR catalyst, a second zone comprising an ammonia slip catalyst (ASC) comprising bi-layer with a bottom layer comprising an ammonia oxidation catalyst and a top layer comprising a portion of the first SCR catalyst that is present in the SCR zone, and a third zone comprising a diesel oxidation catalyst. FIG. 5 depicts a configuration in which the ASC is a bi-layer with a bottom layer comprising an ammonia oxidation catalyst and a top layer comprising the first SCR catalyst. The overall configuration is as described in FIG. 2.

In each of the above configurations, each of the zones can be located on the same substrate or there can be two or more substrates with one or more zones on each substrate. In an exhaust system, when two or more substrates are used, one or more substrates can be located in a single housing or casing or in different housings or casings.

Figure 6:
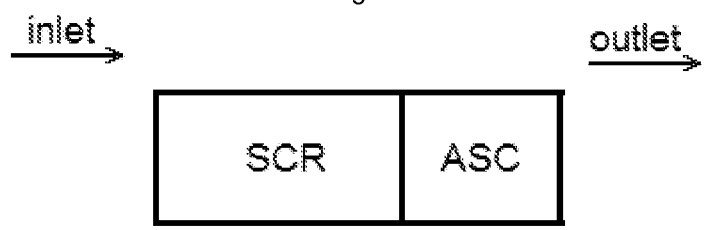
FIG. 6 depicts a configuration in which a first SCR catalyst is positioned in the exhaust gas flow before an ASC.
Figure 7:
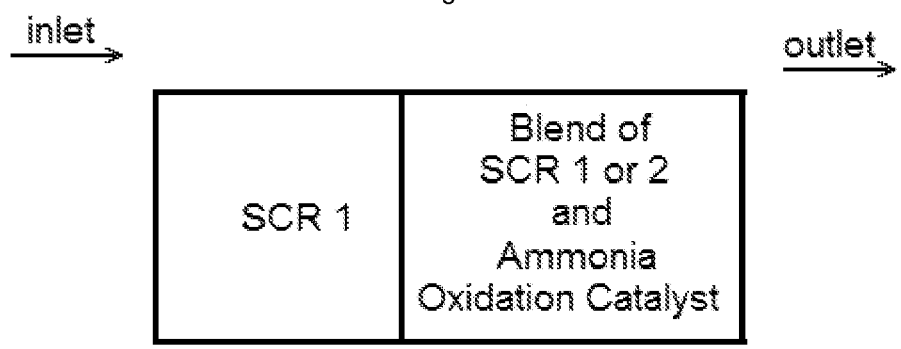
FIG. 7 depicts a configuration in which a first SCR catalyst is positioned in the exhaust gas flow before an ASC and the ASC is a blend of an SCR and an oxidation catalyst.
Figure 8:
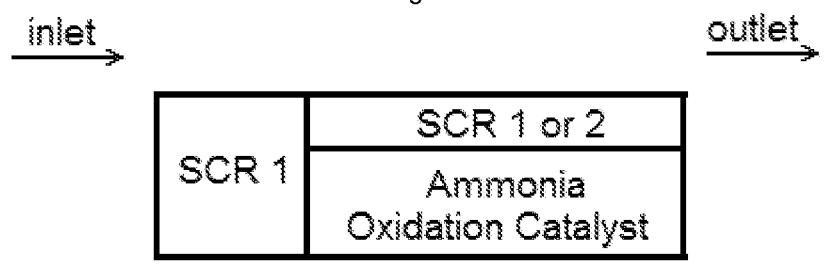
FIG. 8 depicts a configuration in which a first SCR catalyst is positioned in the exhaust gas flow before an ASC and the ASC is a bi-layer with a bottom layer comprising an oxidation catalyst and the top layer comprises an SCR catalyst.
Figure 9:
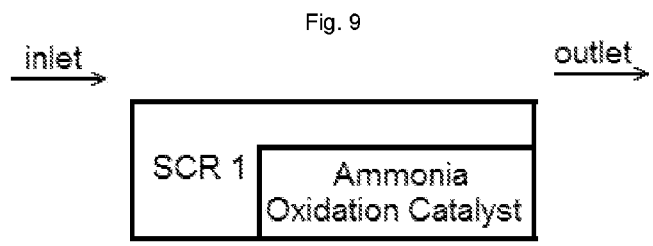
FIG. 9 depicts a configuration in which a first SCR catalyst is positioned in the exhaust gas flow before an ASC and the ASC is a bi-layer in which a portion of the first SCR catalyst is also present in the top layer over the bottom layer comprising an oxidation catalyst.

In another aspect, the invention relates to a catalyst article comprising a substrate comprising an inlet and an outlet, a first zone comprising a first SCR catalyst having a fast response to urea or ammonia and a second zone comprising an ammonia slip catalyst (ASC), where the first zone is located on the inlet side of the substrate and the second zone is located immediately downstream of the first zone. The ammonia slip catalyst (ASC) can comprise a blend of a first or second SCR catalyst and an ammonia oxidation catalyst where the ASC is a blend of an SCR catalyst and platinum on a support with low ammonia storage. (See FIG. 7) The overall configuration is as described in FIG. 6. The second zone can comprise an ammonia slip catalyst (ASC) comprising a bi-layer with a bottom layer comprising an ammonia oxidation catalyst and a top layer comprising a first or second SCR catalyst. (See FIG. 8). The overall configuration is as described in FIG. 6. A catalyst article can comprise a substrate having an inlet and an outlet, a first zone comprising an SCR catalyst and a second zone comprising an ammonia slip catalyst (ASC), where the ASC is a bi-layer with a bottom layer comprising an ammonia oxidation catalyst and a top layer comprising a portion of the first SCR catalyst that is present in the SCR zone. (See FIG. 9) The overall configuration is as described in FIG. 6.

In another configuration, a catalyst article can comprise a first SCR catalyst, an ammonia oxidation catalyst and a DOC catalyst, where the ammonia oxidation catalyst and a portion of the SCR catalyst are positioned on a substrate. The first SCR catalyst is positioned in the exhaust gas flow before an ammonia oxidation catalyst and covers the inlet end of the substrate and a portion of the top of the ammonia oxidation catalyst. (FIG. 1) A DOC catalyst is positioned over the remaining top portion of the ammonia oxidation catalyst. The ASC layer can cover from about 10% to about 50%, preferably from about 15% to about 40% of the length of the substrate. The first SCR layer can cover from about 0% to about 75% of the top length of the ammonia oxidation catalyst.

Figure 12:
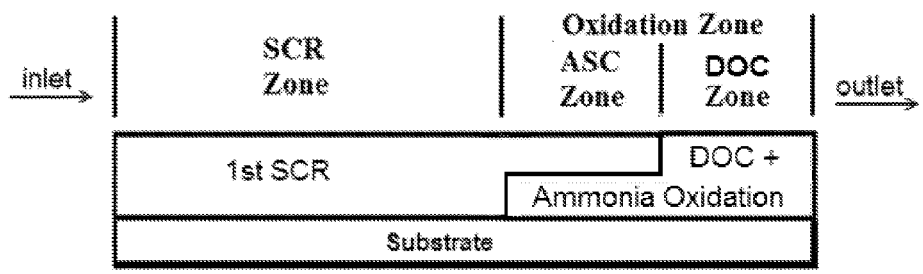
FIG. 12 depicts a configuration in which a first SCR catalyst is positioned in the exhaust gas flow before a mixture of an ammonia oxidation catalyst and a DOC, where the mixture of the ammonia oxidation catalyst and a DOC comprises two stepped portions.

In another configuration, a catalyst article can comprise a first SCR catalyst and an oxidation layer, where the first SCR catalyst and the oxidation layer are positioned on a substrate. The oxidation layer, comprising a mixture of an ammonia oxidation catalyst and a DOC, can be configured as having two steps, a lower step and an upper step, with the upper step at the outlet end of the substrate. The first SCR catalyst is positioned in the exhaust gas flow before the oxidation catalyst and covers the inlet ends of both steps and the top of the first, lower step. (FIG. 12) The second (higher) step in the oxidation catalyst can have approximately the same thickness as the layer comprising the first SCR catalyst. The oxidation layer can cover from about 15% to about 40% of the length of the substrate.

Figure 13:
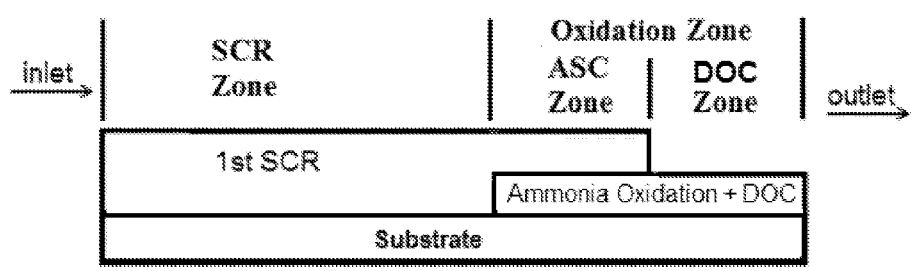
FIG. 13 depicts a configuration in which a first SCR catalyst is positioned in the exhaust gas flow before a mixture of an ammonia oxidation catalyst and a DOC. The mixture of an ammonia oxidation catalyst and a DOC is covered by the first SCR catalyst in the ASC zone.

In another configuration, a catalyst article can comprise a first SCR catalyst and an oxidation layer, where the first SCR catalyst and the oxidation layer are positioned on a substrate. The oxidation layer comprises a mixture of an ammonia oxidation catalyst and a DOC. The first SCR catalyst is positioned in the exhaust gas flow before the oxidation catalyst and covers the inlet end and the top of the oxidation layer in the ASC zone. The DOC zone comprises a portion of the mixture of an ammonia oxidation catalyst and a DOC, but does not have a layer of an SCR catalyst over the oxidation layer. (FIG. 13) The oxidation layer can cover from about 15% to about 40% of the length of the substrate.

Figure 14:
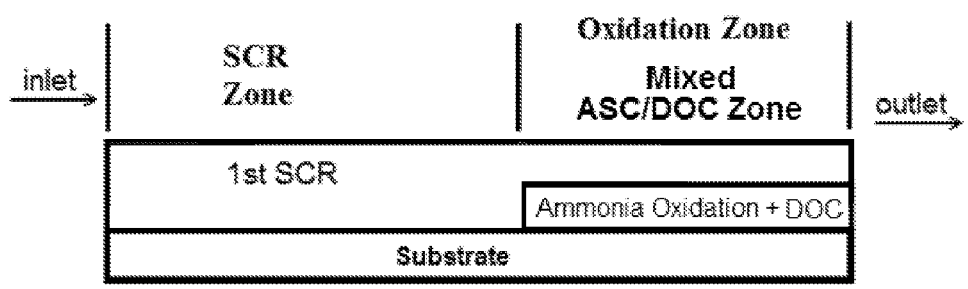
FIG. 14 depicts a configuration in which a first SCR catalyst is positioned in the exhaust gas flow before a mixture of an ammonia oxidation catalyst and a DOC. The mixture of an ammonia oxidation catalyst and a DOC is completely covered by the first SCR catalyst in a mixed ASC/DOC zone.

In another configuration, a catalyst article can comprise a first SCR catalyst and an oxidation layer, where the first SCR catalyst and the oxidation layer are positioned on a substrate. The oxidation layer comprises a mixture of an ammonia oxidation catalyst and a DOC. The first SCR catalyst is positioned in the exhaust gas flow before the oxidation catalyst and covers the inlet end and the top of the oxidation layer in the mixed oxidation ASC/DOC zone. (FIG. 14) The oxidation layer can cover from about 15% to about 40% of the length of the substrate.

Figure 15:
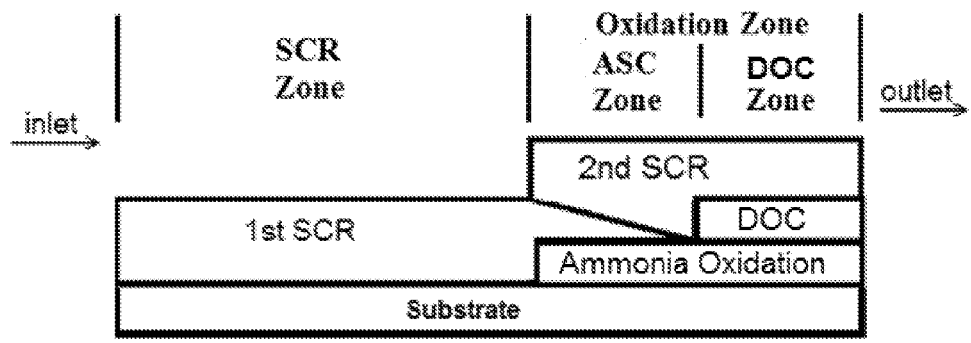
FIG. 15 depicts a configuration in which a first SCR catalyst is positioned in the exhaust gas flow before two oxidation layers and a second SCR layer is present over the oxidation layers and covers part of the first SCR layer.

In another configuration, a catalyst article can comprise a first SCR catalyst, a second SCR catalyst, an ammonia oxidation catalyst and a DOC, where the first SCR catalyst and the ammonia oxidation catalyst are positioned on a substrate. The first SCR catalyst is positioned in the exhaust gas flow before the ammonia oxidation catalyst and covers the inlet end and a portion of the top of the ammonia oxidation catalyst. (FIG. 15) The DOC is positioned over the remaining top portion of the ammonia oxidation catalyst and the second SCR catalyst covers the inlet side and the top of the DOC catalyst and a portion of the first SCR catalyst. A second SCR catalyst covers the inlet side and the top of the DOC catalyst and a portion of the first SCR catalyst in the ASC zone. FIG. 15 shows the junction between the first and the second SCR catalysts as a line. Junctions having other shapes, such as a stepped or curve, can also be used. The ASC layer can cover from about 15% to about 40% % of the length of the substrate. The DOC or DEC layer can cover from about 10% to about 30% of the length of the ammonia oxidation catalyst. The second SCR catalyst can cover the inlet side and the top of the DOC, but not a portion of the first SCR catalyst. This configuration is not shown in the figures.

Figure 16:
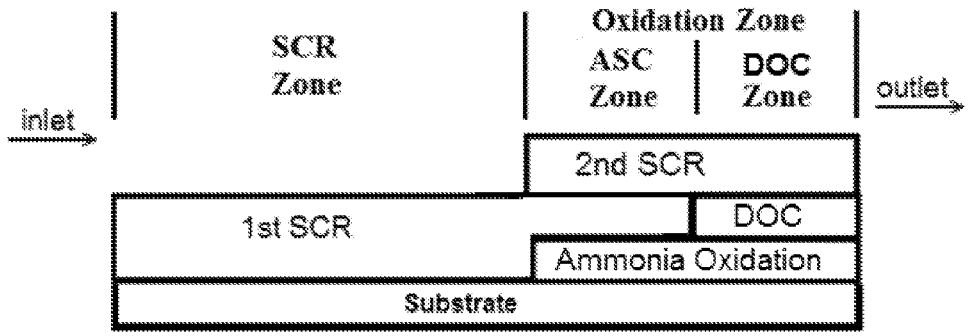
FIG. 16 depicts a configuration in which a first SCR catalyst is positioned in the exhaust gas flow before two oxidation layers and a second SCR layer is present over the oxidation layers and covers part of the first SCR layer.

In another configuration, a catalyst article can comprise a first SCR catalyst, a second SCR catalyst, an ammonia oxidation catalyst and a DOC, where the first SCR catalyst and the ammonia oxidation catalyst are positioned on a substrate. The first SCR catalyst is positioned in the exhaust gas flow before the ammonia oxidation catalyst and covers the inlet end and a portion of the top of the ammonia oxidation catalyst. (FIG. 16) The DOC is positioned over the remaining top portion of the ammonia oxidation catalyst and the second SCR catalyst covers the top of the DOC catalyst and the portion of the first SCR catalyst in the ASC zone. The ASC layer can cover from about 15% to about 40% % of the length of the substrate. The DOC layer can cover from about 10% to about 30% of the length of the ammonia oxidation catalyst.

Figure 17:
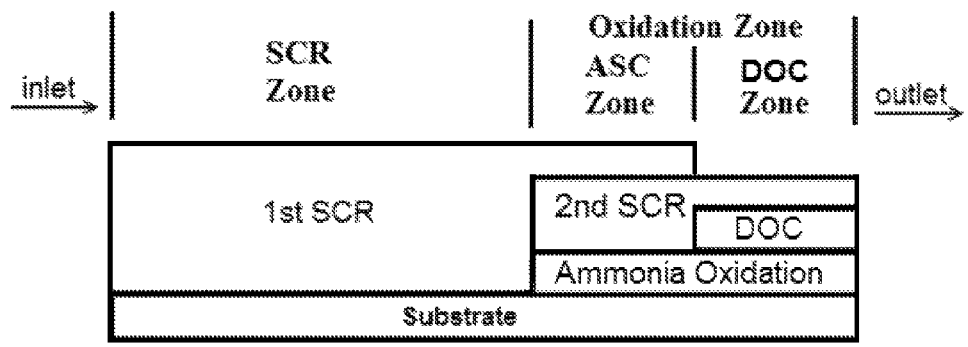
FIG. 17 depicts a configuration in which a first SCR catalyst is positioned in the exhaust gas flow before two oxidation layers and a second SCR layer is present over the oxidation layers and the first SCR layer covers part of the second SCR layer.

In another configuration, a catalyst article can comprise a first SCR catalyst, a second SCR catalyst, an ammonia oxidation catalyst and a DOC, where the first SCR catalyst and the ammonia oxidation catalyst are positioned on a substrate. The first SCR catalyst is positioned in the exhaust gas flow before the ammonia oxidation catalyst and covers the inlet end of the ammonia oxidation catalyst and the inlet end and top of the second SCR catalyst. (FIG. 17) The DOC is positioned over the remaining top portion of the ammonia oxidation catalyst and is only present in the DOC zone. The second SCR catalyst covers the top of the DOC catalyst and the inlet end of the DOC catalyst. The ASC layer can cover from about 15% to about 40% % of the length of the substrate. The DOC layer can cover from about 10% to about 30% of the length of the ammonia oxidation catalyst.

Figure 18:
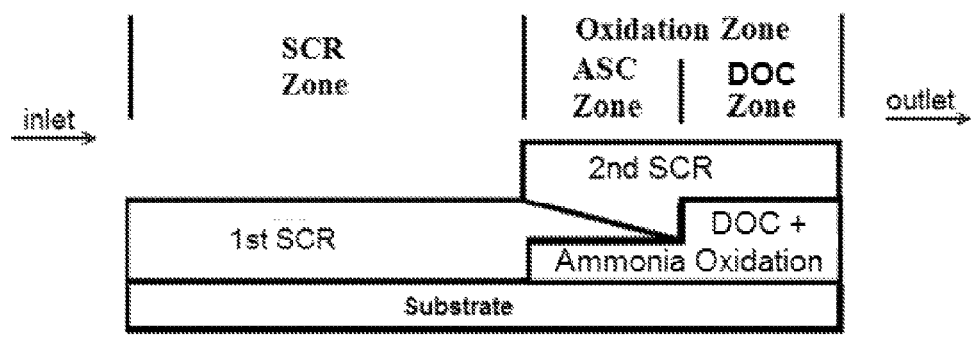
FIG. 18 depicts a configuration in which a first SCR catalyst is positioned in the exhaust gas flow before a mixed oxidation layer having a 2-step form and a second SCR layer is present over the oxidation layers and covers part of the first SCR layer.

In another configuration, a catalyst article can comprise a first SCR catalyst, a second SCR catalyst, and a combined ammonia oxidation catalyst and DOC, where the first SCR catalyst and the combined ammonia oxidation catalyst and DOC are positioned on a substrate. The combined ammonia oxidation catalyst and DOC can be configured as having two steps, a lower step and an upper step, with the upper step at the outlet end of the substrate. The first SCR catalyst is positioned in the exhaust gas flow before the combined ammonia oxidation catalyst and DOC and covers the inlet end and a portion of the top of the combined ammonia oxidation catalyst and DOC. (FIG. 18) A second SCR catalyst covers the inlet side of the highest step of the combined ammonia oxidation catalyst and DOC, the top of the combined ammonia oxidation catalyst and DOC and a portion of the first SCR catalyst in the ASC zone. FIG. 18 shows the junction between the first and the second SCR catalysts as a line. Junctions having other shapes, such as a stepped or curve, can also be used. The ASC layer can cover from about 15% to about 40% % of the length of the substrate. The DOC layer can cover from about 10% to about 30% of the length of the ammonia oxidation catalyst.

Figure 19:
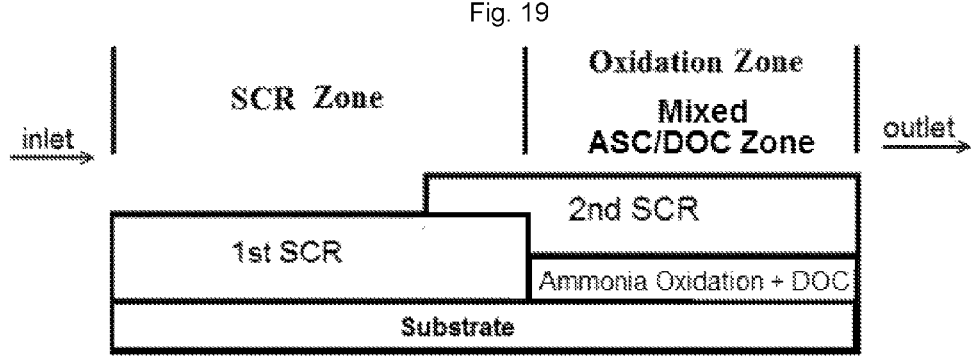
FIG. 19 depicts a configuration in which a first SCR catalyst is positioned in the exhaust gas flow before a mixed oxidation layer having a 2-step form and a second SCR layer is present over the oxidation layers and covers part of the first SCR layer.

In another configuration, a catalyst article can comprise a first SCR catalyst, a second SCR catalyst, and a combined ammonia oxidation catalyst and DOC, where the first SCR catalyst and the combined ammonia oxidation catalyst and DOC are positioned on a substrate. The first SCR catalyst is positioned in the exhaust gas flow before the ammonia oxidation catalyst and covers the inlet end of the combined ammonia oxidation catalyst and DOC. (FIG. 19) The second SCR catalyst covers the top of the combined ammonia oxidation catalyst and DOC and the portion of the first SCR catalyst in the SCR zone. The ASC layer can cover from about 15% to about 40% % of the length of the substrate. The DOC layer can cover from about 10% to about 30% of the length of the ammonia oxidation catalyst.

Figure 20:
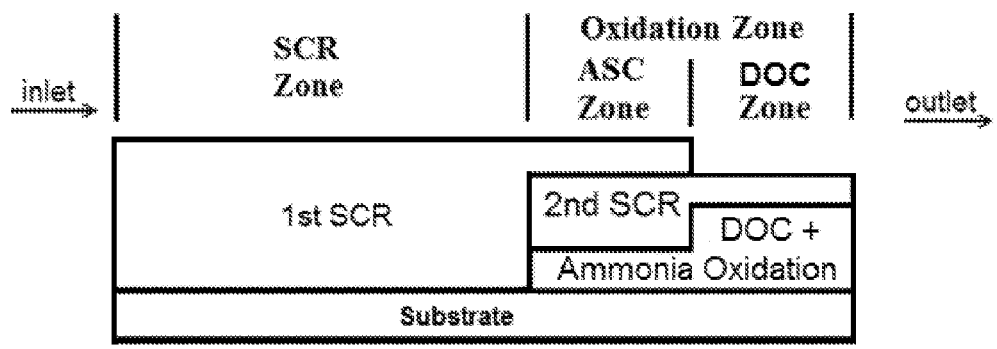
FIG. 20 depicts a configuration in which a first SCR catalyst is positioned in the exhaust gas flow before a mixed oxidation layer having a 2-step form and a second SCR layer is present over the oxidation layers and the first SCR layer covers part of the second SCR layer.

In another configuration, a catalyst article can comprise a first SCR catalyst, a second SCR catalyst, and combined ammonia oxidation catalyst and DOC, where the first SCR catalyst and the ammonia oxidation catalyst are positioned on a substrate. The combined ammonia oxidation catalyst and DOC can be configured as having two steps, a lower step and an upper step, with the upper step at the outlet end of the substrate. The first SCR catalyst is positioned in the exhaust gas flow before the combined ammonia oxidation catalyst and DOC and covers the inlet end of the combined ammonia oxidation catalyst and DOC and the inlet end and top of the second SCR catalyst. (FIG. 20) The second SCR catalyst covers the top of the combined ammonia oxidation catalyst and DOC can be configured as having two steps, a lower step and an upper step, with the upper step at the outlet end of the substrate. The layer comprising the combined ammonia oxidation catalyst and DOC can cover from about 15% to about 40% % of the length of the substrate.

Figure 21:
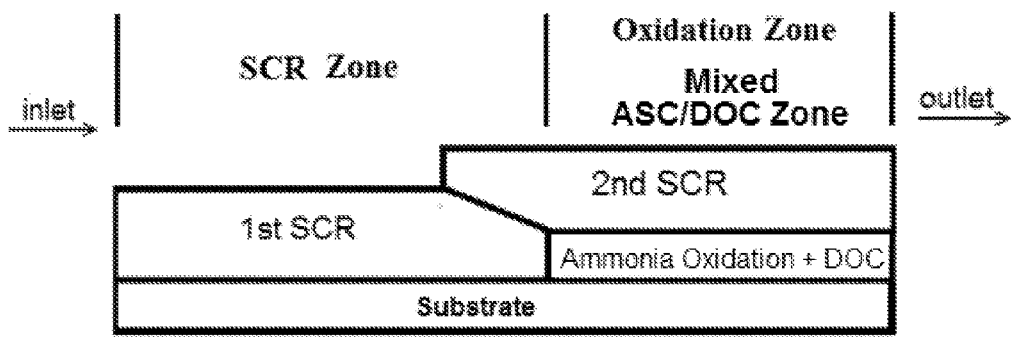
FIG. 21 depicts a configuration in which a first SCR catalyst is positioned in the exhaust gas flow before a mixed oxidation layer and a second SCR layer is present over the oxidation layers and covers part of the first SCR layer in the SCR zone.

In another configuration, a catalyst article can comprise a first SCR catalyst, a second SCR catalyst, and a combined ammonia oxidation catalyst and DOC, where the first SCR catalyst and the combined ammonia oxidation catalyst and DOC are positioned on a substrate. The combined ammonia oxidation catalyst and DOC can be configured as having two steps, a lower step and an upper step, with the upper step at the outlet end of the substrate. The first SCR catalyst is positioned in the exhaust gas flow before the combined ammonia oxidation catalyst and DOC and covers the inlet end of the combined ammonia oxidation catalyst and DOC. (FIG. 21) A second SCR catalyst covers the top of the combined ammonia oxidation catalyst and a portion of the first SCR catalyst in the SCR zone. FIG. 21 shows the junction between the first and the second SCR catalysts as a line. Junctions having other shapes, such as a stepped or curve, can also be used. The ASC layer can cover from about 15% to about 40% % of the length of the substrate. The combined ammonia oxidation catalyst and DOC layer can cover from about 10% to about 30% of the length of the ammonia oxidation catalyst.

Figure 22:
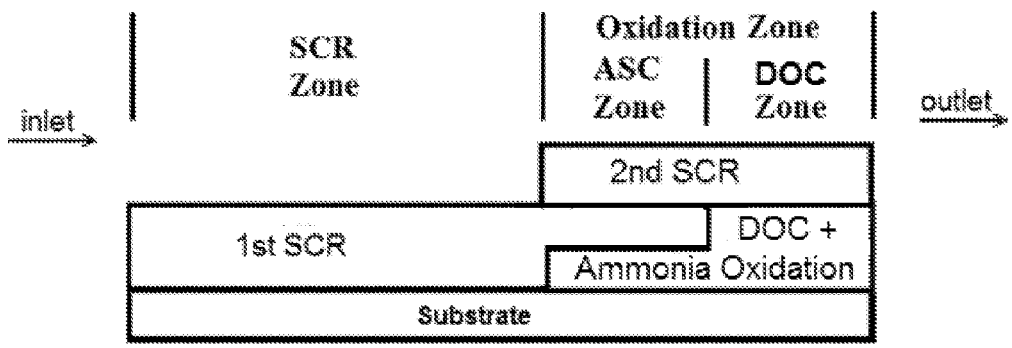
FIG. 22 depicts a configuration in which a first SCR catalyst is positioned in the exhaust gas flow before a mixed oxidation layer having a 2-step form and a second SCR layer is present over the oxidation layers and covers the first SCR layer in the ASC zone.

In another configuration, a catalyst article can comprise a first SCR catalyst, a second SCR catalyst, and a combined ammonia oxidation catalyst and DOC, where the first SCR catalyst and the combined ammonia oxidation catalyst and DOC are positioned on a substrate. The combined ammonia oxidation catalyst and DOC can be configured as having two steps, a lower step and an upper step, with the upper step at the outlet end of the substrate. The first SCR catalyst is positioned in the exhaust gas flow before the combined ammonia oxidation catalyst and DOC and covers the inlet end of the combined ammonia oxidation catalyst and DOC and the top portion of the combined ammonia oxidation catalyst and DOC in the ASC zone. (FIG. 22) The second SCR catalyst covers the top of the combined ammonia oxidation catalyst and DOC in the DOC zone and the portion of the first SCR catalyst in the SCR zone. The ASC layer can cover from about 15% to about 40% % of the length of the substrate. The DOC layer can cover from about 10% to about 30% of the length of the ammonia oxidation catalyst.

Figure 23:
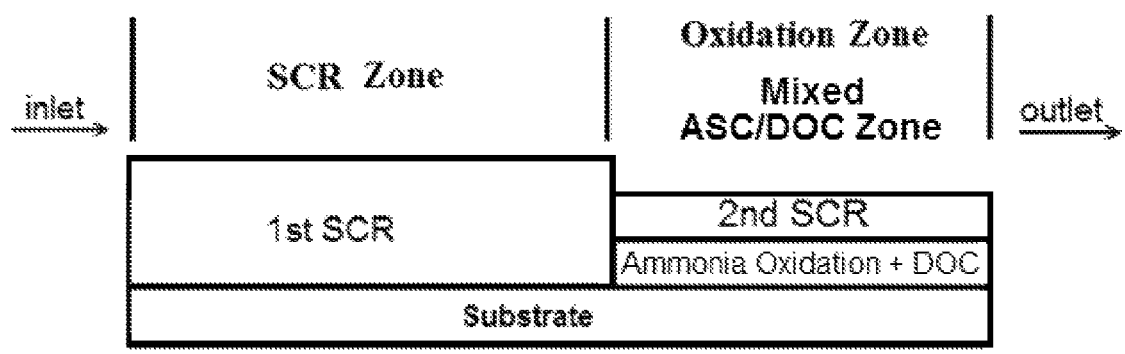
FIG. 23 depicts a configuration in which a first SCR catalyst is positioned in the exhaust gas flow before a mixed oxidation layer and a second SCR layer is present over the oxidation layers and the first SCR layer covers the second SCR layer in part, but not all, of the mixed oxidation zone.

In another configuration, a catalyst article can comprise a first SCR catalyst, a second SCR catalyst, and combined ammonia oxidation catalyst and DOC, where the first SCR catalyst and combined ammonia oxidation catalyst and DOC are positioned on a substrate. The first SCR catalyst is positioned in the exhaust gas flow before the combined ammonia oxidation catalyst and DOC and covers the inlet end of the combined ammonia oxidation catalyst and DOC and the inlet end and top of the second SCR catalyst. (FIG. 23) The second SCR catalyst covers the top of the combined ammonia oxidation. The layer comprising the combined ammonia oxidation catalyst and DOC can cover from about 15% to about 40% % of the length of the substrate.

As shown above and in the figures, the first SCR catalyst can overlap a portion of the ASC zone or a mixed ASC/DOC zone. The catalytic article can have: (a) an ASC zone comprising a bottom layer comprising an ammonia oxidation catalyst and a top layer comprising the first SCR catalyst, where the first SCR catalyst covers the entire portion of the ammonia oxidation catalyst in the ASC zone, and (b) a DOC zone comprises a bottom layer comprising an ammonia oxidation catalyst and a top layer comprising the DOC catalyst, where the DOC catalyst covers the entire portion of the ammonia oxidation catalyst in the DOC zone.

The ASC zone can comprise a bottom layer comprising a mixture of an ammonia oxidation catalyst and a DOC, and a portion of the first SCR also forms a top layer that covers the entire portion of the mixture of the ammonia oxidation catalyst and the DOC in the ASC zone, and the DOC zone comprises a mixture of an ammonia oxidation catalyst and a DOC, where the mixture is located on the substrate in the ASC zone and the DOC zone.

The ASC zone can comprise a bottom layer comprising a mixture of an ammonia oxidation catalyst and a DOC, where the bottom layer is located on the substrate, and a portion of the first SCR forms a top layer that covers the entire portion of the bottom layer in the ASC zone, and the DOC zone comprises a mixture of an ammonia oxidation catalyst and a DEC, where the mixture of an ammonia oxidation catalyst and a DOC in the DOC zone is located on the substrate.

The oxidation zone can comprise a mixed ASC/DOC zone comprising a bottom layer comprising a mixture of an ammonia oxidation catalyst and a DOC, and a top layer comprising the first SCR, where the top layer covers the entire bottom layer, and the bottom layer is located on the substrate.

In some configurations, the catalytic article can further comprise a second SCR catalyst, where the second SCR catalyst covers a portion of the first SCR catalyst and the second SCR catalyst is the same as, or different than, the first SCR catalyst.

The catalytic article can further comprise a second SCR catalyst, where the first SCR catalyst covers a portion of the second SCR catalyst and the second SCR catalyst is the same as, or different than, the first SCR catalyst. The ASC zone can comprise the first SCR catalyst, the second SCR catalyst and an ammonia oxidation catalyst. The ASC zone can comprise a bottom layer comprising an ammonia oxidation catalyst, a middle layer comprising the first SCR catalyst, and a third layer comprising the second SCR catalyst. The thickness of the middle layer can decrease from the inlet side of the ASC zone to the outlet side of the ASC zone, the thickness of the second SCR catalyst can increase from the inlet side of the ASC zone to the outlet side of the ASC zone, and the DOC zone can comprise a bottom layer comprising an ammonia oxidation catalyst, a middle layer comprising a DOC and a top layer comprising the second SCR, where the bottom layer in the ASC zone and the DOC zone is located on the substrate, and the DOC is located only in the DOC zone.

When the catalyst comprises a second SCR catalyst, the second SCR catalyst can cover a portion of the first SCR catalyst and the second SCR catalyst can be the same as, or different than, the first SCR catalyst.

When the catalyst comprises a second SCR catalyst, the ASC zone can comprise a bottom layer comprising a mixture of an ammonia oxidation catalyst and a DOC, a middle layer comprising the first oxidation catalyst, and a third layer comprising the second SCR catalyst. The thickness of the middle layer can decrease from the inlet side of the ASC zone to the outlet side of the ASC zone, the thickness of the second SCR catalyst can increase from the inlet side of the ASC zone to the outlet side of the ASC zone, and the DOC zone can comprise a bottom layer comprising a mixture of an ammonia oxidation catalyst and a DOC and a top layer comprising the second SCR, where the bottom layer in the ASC zone and the DOC zone is located on the substrate.

When the catalyst comprises a second SCR catalyst, the SCR zone can comprise the first SCR catalyst and the second SCR catalyst where the second SCR catalyst overlaps a portion of the first SCR catalyst in the SCR zone, and the mixed ASC/DOC zone comprises a bottom layer comprising a mixture of an ammonia oxidation catalyst and a DOC, where the bottom layer is located on the substrate, and a top layer comprising the second SCR that covers the entire portion of the bottom layer in the mixed ASC/DOC zone.

SCR Catalysts

In various embodiments, the compositions can comprise one or two SCR catalysts. The first SCR catalyst is always present in the compositions. The second SCR catalyst can be the same as, or different than, the first SCR. Preferably the second SCR catalyst is different than the first SCR catalyst. The first SCR catalyst can be different from the second SCR catalyst by comprising a different active component, as described below, by having a different loading of the active component, or both.

The catalytic article can further comprise a second SCR catalyst, where the second SCR catalyst covers a portion of the first SCR catalyst and all of the DOC layer and the second SCR catalyst coating comprises a second SCR catalyst that is the same as, or different than, the first SCR catalyst.

One of the properties of the catalytic article is that the catalyst can provide $NH_3$ slip control selectivity by converting about 90% of the NOx generated in $NH_3$ oxidation by the ASC and DOC zones to nitrogen and water.

The first SCR catalyst, and, when the second SCR catalyst is present, the first and second SCR catalysts comprise an active component independently selected from the group consisting of a base metal, an oxide of a base metal, a molecular sieve, a metal exchanged molecular sieve or a mixture thereof. The base metal can be selected from the group consisting of vanadium (V), molybdenum (Mo), tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. The SCR catalysts can comprise Nb—Ce—Zr or Nb on $Mn_2$. These catalysts may contain other inorganic materials, such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MNO_2$, $Mn_2O_3$, $Fe_2O_3$, $SnO_2$, CuO, CoO, CeO$_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalysts can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

The SCR catalysts can comprise a small pore, a medium pore or a large pore molecular sieve, or combinations thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms.

The SCR catalysts can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

The SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

The SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

The SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal, is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, the first and second catalysts can comprise a Cu-SCR, Fe-SCR, vanadium, promoted Ce—Zr or promoted $MnO_2$.

The second SCR catalyst is preferably a Cu-SCR catalyst or an Fe-SCR catalyst, more preferably a Cu-SCR catalyst. The Cu-SCR catalyst comprises copper and a small pore molecular sieve. The Fe-SCR catalyst comprises iron and a molecular sieve, preferably a large pore molecular sieve such a BEA. The copper or iron can be located within the framework of the molecular sieve and/or in extra-framework (exchangeable) sites within the molecular sieve.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) or iron (Fe) supported molecular sieve having from about 0.1 to about 20.0 wt. % copper or iron of the total weight of the catalyst. More preferably copper or iron is present from about 0.5 wt. % to about 15 wt. % of the total weight of the catalyst. Most preferably copper or iron is present from about 1 wt. % to about 9 wt. % of the total weight of the catalyst.

In the various configurations described above, palladium can be present in the rear SCR catalyst to help increase exotherms produced by the catalyst without affecting the ASC selectivity.

Diesel Oxidation Catalyst

The diesel oxidation catalyst (DOC) can comprise a noble metal, a base metal or a zeolite, preferably a platinum group metal or mixtures thereof. Preferably the diesel oxidation catalyst comprises platinum, palladium, or a combination of platinum and palladium. The platinum group metal can be present in an amount from about 5 $g/ft^3$ to about 75 $g/ft^3$, preferably from about 8 $g/ft^3$ to about 50 $g/ft^3$, more preferably from about 10 $g/ft^3$ to about 30 $g/ft^3$. The diesel oxidation catalyst can comprise a combination of platinum (Pt) and palladium (Pd) wherec Pt and Pd are present in a ratio of from 1:0 to 0:1, endpoints included. The combination of Pt and Pd can provide an exotherm to the DOC catalyst. The DOC can cover between about 10% to about 40% of the length of the support, preferably between about 10% to about 30% of the length of the support, more preferably between about 10% to about 25% of the length of the support.

The DOC can be a DEC. The DEC can comprise a noble metal, a base metal or a zeolite, preferably a platinum group metal, more preferably platinum, palladium or a combination of platinum and palladium. When the DOC is a DEC, the DEC can generate an exotherm and generate $NO_2$ for passive regeneration of a downstream filter. The DEC can comprise a combination of platinum and palladium where the weight ratio of Pt:Pd is from 1:0 to 0:1, endpoint not included. The DEC catalyst can be present in a loading from about 5 to about 75 $g/ft^3$, inclusive, preferably from about 10 to about 40 $g/ft^3$, inclusive.

Ammonia Slip Catalyst

The ammonia slip catalyst can comprise a top layer comprising an SCR catalyst over a bottom layer comprising an oxidation catalyst. The ammonia oxidation catalyst can comprise a platinum group metal, preferably platinum or palladium or a mixture there of. The platinum group metal can be present on a support comprising a molecular sieve, a metal exchanged molecular sieve on a support with low ammonia storage, preferably on a support having low ammonia storage. The ammonia slip catalyst can comprise a blend of platinum on a support with low ammonia storage with an SCR catalyst. The platinum group metal loading in the ammonia oxidation catalyst can range from about 0.5 to about 10 $g/ft^3$, inclusive, preferably from about 1 to about 5 $g/ft^3$, inclusive. The ammonia oxidation catalyst can cover about 10% to about 40% of the length of the support, preferably about 15% to about 30% of the length of the support. The ASC can contain a zeolite or a metal exchanged zeolite in addition to the PGM on a support.

The ammonia slip catalyst can be a bi-layer with a lower layer comprising an ammonia oxidation catalyst and an upper layer, comprising an SCR catalyst. The ammonia oxidation catalyst is preferably a platinum group metal, preferably platinum, palladium, ruthenium or a mixture thereof. The bi-layer ammonia slip catalyst preferably comprises a bottom layer comprising platinum or a mixture of platinum and palladium, and a top layer comprising a blend of palladium on a support with a copper zeolite, preferably a copper chabazite. These compositions can help improve the exothermic performance of the catalyst. The ammonia slip catalyst can be a single layer comprising a blend of an oxidation catalyst and an SCR catalyst.

The ammonia oxidation catalyst, and in some embodiments the DOC, can comprise a platinum group metal, preferably platinum, palladium, ruthenium or a combination thereof. The platinum group metal can be present in an amount from about 0.5 $g/ft^3$ to about 50 $g/ft^3$, preferably from 1 $g/ft^3$ to 30 $g/ft^3$. The oxidation catalyst can comprise a combination of platinum (Pt) and palladium (Pd) where Pt and Pd are present in a ratio of from 10:1 to 1:100 by weight, preferably from 5:1 to 1:10 by weight.

The ammonia oxidation catalyst can comprise platinum on a support with low ammonia storage. The support with low ammonia storage can be a siliceous support. The siliceous support can comprise a silica or a zeolite with a silica-to-alumina ratio of at least one of: (a) at least 100, (b) at least 200, (c) at least 250, (d) at least 300, (e) at least 400, (f) at least 500, (g) at least 750 and (h) at least 1000. The siliceous support can comprise a molecular sieve having a BEA, CDO, CON, FAU, MEL, MFI or MWW Framework Type. The ratio of the amount of the SCR catalyst to the amount of platinum on the support with low ammonia storage can be in the range of 0:1 to 300:1, preferably 3:1 to 300:1, more preferably 7:1 to 100:1 and most preferably 10:1 to 50:1, including each of the end-points in the ratio, based on the weight of these components.

When the ammonia slip catalyst is a single layer comprising a mixture of an SCR catalyst and an oxidation catalyst, the blend can further comprise Pd, Nb—Ce—Zr or Nb on $Mn_2$.

The catalysts described herein can be used in the SCR treatment of exhaust gases from various engines. One of the properties of a catalyst comprising a blend of platinum on a siliceous support with a first SCR catalyst, where the first SCR catalyst is a Cu-SCR catalyst, is that it can provide an improvement in $N_2$ yield from ammonia at a temperature from about 250° C. to about 350° C. compared to a catalyst comprising a comparable formulation in which the first SCR catalyst is present as a first layer and platinum is supported on a layer that stores ammonia is present in a second layer and gas comprising $NH_3$ passes through the first layer before passing through the second layer. Another property of a catalyst comprising a blend of platinum on a siliceous support with a first SCR catalyst, where the first SCR catalyst is a Cu-SCR catalyst, is that it can provide reduced $N_2O$ formation from $NH_3$ compared to a catalyst comprising a comparable formulation in which the first SCR catalyst is present as a first layer and the supported platinum is present in a second layer and gas comprising $NH_3$ passes through the first layer before passing through the second layer. Another property of a catalyst comprising a blend of platinum on a support with low ammonia storage with a first SCR catalyst, where the first SCR catalyst is a Cu-SCR catalyst or an Fe-SCR catalyst, is that it can provide reduced $N_2O$ formation from $NH_3$ compared to a catalyst comprising a comparable formulation in which the first SCR catalyst is present as a first layer and platinum supported on a support that stores ammonia is present in a second coating and gas comprising $NH_3$ passes through the first layer before passing through the second coating.

A catalyst article can comprise a substrate comprising an inlet and an outlet, a first zone comprising a first SCR catalyst and a second zone comprising an oxidation catalyst, where the first zone is located on the inlet side of the substrate, and the second zone is located on the outlet side of the substrate. The catalyst article can comprise a substrate comprises a first substrate and a second substrate, where each substrate comprises an inlet end and an outlet end, and at least a portion of the first zone is located on the first substrate and a portion of the second zone is located on the second substrate, where the first zone is located on the inlet side of the first substrate and the second zone is located on the outlet side of the second substrate. The catalyst article can comprise a substrate comprises a first substrate and a second substrate, each substrate comprises an inlet end and an outlet end, and the first zone and the third zone are located on the first substrate, where the first zone is located on the inlet side of the first substrate and the third zone is located on the outlet side of the first substrate, and the second zone is located on the second substrate. The catalyst article can comprise a substrate comprising a first substrate and a second substrate, where each substrate comprises an inlet end and an outlet end, and the first zone is located on the first substrate, and the second zone is located on the second substrate, where the second zone is located on the inlet side of the second substrate and the third zone is located on the outlet side of the second substrate.

In one aspect of the invention, various configurations of catalysts can be prepared depending upon the desired configuration of the ASC. The portion of the catalyst comprising a blend of platinum on a support does not store ammonia with a first SCR catalyst is labeled as "blend" in the figures described below.

The substrate for the catalyst may be any material typically used for preparing automotive catalysts that comprises a flow-through or filter structure, such as a honeycomb structure, an extruded support, a metallic substrate, or a SCRF. Preferably the substrate is an inert substrate. The substrate preferably has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The passages, which are essentially straight paths from their fluid inlet to their fluid outlet, are defined by walls onto which the SCR catalyst is coated as a "washcoat" so that the gases flowing through the passages contact the catalytic material. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The substrates can be a high porosity substrate. The term "high porosity substrate" refers to a substrate having a porosity of between about 40 and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Preferably, the substrate can be cordierite, a high porosity cordierite, a metallic substrate, an extruded SCR, a filter, an SCRF or an extruded catalyst.

A washcoat comprising one or more of the catalyst can be applied to a substrate using a method known in the art. After application of the washcoat, the composition can be dried and optionally calcined. At least one washcoat application is needed for each of the zone. When two of more washcoats are applied to a single substrate, the washcoats are preferably dried before an additional washcoat is applied to the substrate. After the last washcoat is applied to a substrate, the substrate with the washcoat layers can be dried and calcined. The time, temperature and conditions for calcining the washcoated substrate depend upon the catalysts, supports and substrates used. The calcination can be performed under dry conditions or hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

A washcoat comprising a blend of platinum on a siliceous support and a first SCR catalyst, where the first SCR catalyst is a Cu-SCR catalyst, can be applied to the inlet side of the substrate using a method known in the art. After application of the washcoat, the composition can be dried and calcined. When the composition comprises a second SCR, the second SCR can be applied in a separate washcoat to either a dried article or a calcined article having the bottom layer, as described above. After the second washcoat is applied, it can be dried and calcined as performed for the first layer.

The substrate with the platinum containing layer can be dried and calcined at a temperature within the range of 400° C. to 1200° C., preferably 450° C. to 700° C., and more preferably 500° C. to 650° C. The calcination is preferably done under dry conditions, but it can also be performed hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

The catalytic article can be present in more than one piece. The catalytic article may be a single piece comprising a single substrate comprising the first second and third zones, or a plurality of pieces, each containing one or more substrates each containing on or more zones. When placed in an exhaust system of an engine, the pieces can be linked, or joined, together. The linkage can be permanent, such as by welding, or detachable, such as by the use of fasteners, such as nuts and bolts. The catalysts article can comprise a first piece and a second piece, where the first piece comprises the first zone and the second zone and the second piece comprises the third zone. The catalysts article can comprise a first piece and a second piece, where the first piece comprises the first zone and the second piece comprises the second zone and the third zone. The catalysts can comprise a first piece, a second piece and a third piece, where the first piece comprises the first zone, the second piece comprises the second zone and the third piece comprises the third zone.

The SCR catalyst requires the presence of a reductant such as ammonia to function. Normally an ammonia precursor, such as urea, is injected into the exhaust gas stream where it becomes converted into ammonia. An exhaust system can comprise a catalyst article of the first aspect of the invention and a first means for introducing $NH_3$ into the exhaust gas or forming $NH_3$ in the exhaust gas, where the first means for introducing $NH_3$ into the exhaust gas or forming $NH_3$ in the exhaust gas in located before the catalytic article. The exhaust system can further comprise a CSF (catalysed soot filter), a DPF (diesel particulate filter) or an SCRF (SCR on filter), where the CSF, DPF or SCRF are positioned downstream of the DOC. Generally the CSF, DPF or SCRF are located downstream of the catalytic article. The CSF or DPF can be followed by an SCR and then by an ASC. When the system comprises an SCR or an SCRF after the DOC, a second means for introducing $NH_3$ into the exhaust gas or forming $NH_3$ in the exhaust gas can be located between the catalytic article and the SCR or SCRF. The exhaust system can further comprise a CSF or an SCRF, where the CSF or SCRF are positioned downstream of the catalytic article and, when the system comprises an SCRF, a second means for introducing $NH_3$ into the exhaust gas or forming $NH_3$ in the exhaust gas is located between the catalytic article and the SCRF.

In another aspect of the invention, an engine can comprise an exhaust system comprising a catalyst article of the first aspect of the invention and a means for introducing $NH_3$ into the exhaust gas or forming $NH_3$ in the exhaust gas, where the first means for introducing $NH_3$ or forming $NH_3$ in the exhaust gas can be located before the catalytic article. The engine can be a diesel engine on a vehicle, a diesel engine on a stationary source, or a diesel engine on a vessel, such as a ship.

The use of the catalytic articles described above allows for high NOx conversion early in a cold start cycle. A catalyst with high V loading can be used because the catalyst only needs to be active at low temperature. NOx is converted immediately without being stored. This can reduce the amount of ammonia slip that needs to be converted by an ASC, reducing the need for an ASC to function well at lower temperatures during start-up. Because there is less need for ammonia storage, it can be easier to control the injection of urea. At higher temperatures, $NH_3$ does not need to be injected if an additional SCR system is located downstream of the catalyst article.

The catalytic articles described herein can preferably generate some $NO_2$ during normal operation in order to promote passive regeneration of a filter located downstream of the catalyst article. Preferably, the catalyst articles can generate an exotherm or promote passive regeneration. More preferably, the catalyst articles can generate an exotherm and promote passive regeneration. The term "can generate an exotherm" means that the catalyst article can combust ULSD or equivalent fuel at a 300° C. catalyst inlet temperature and generate ≤150° C. temperature increase across the catalyst, with HC slip <1500 ppm C1, across all engine operating points.

An exhaust system can comprise the catalytic article of the first aspect of the invention and a means for forming $NH_3$ in the exhaust gas or introducing $NH_3$ into the exhaust gas. The exhaust system can provide low temperature NOx control coupled with good ASC selectivity and DOC capability. The catalytic article of the first aspect of the invention can be close coupled to an engine.

A method of providing low temperature NOx control coupled with good ASC selectivity and DOC capability in the exhaust from a diesel engine comprising contacting an exhaust gas from the engine with a catalyst article of the first aspect of the invention.

The following examples merely illustrate the invention; the skilled person will recognize many variations that are within the spirit of the invention and scope of the claims.

EXAMPLES

The following examples describe various catalytic articles that can be made in practicing the invention described herein. One of ordinary skill in the art would recognize various modifications and/or replacements that can be made to the examples, as described herein.

Example 1

A catalytic article is prepared by first forming a layer comprising an ammonia oxidation catalyst by placing a washcoat containing one of the ammonia oxidation catalysts below on an extruded honeycomb substrate from the outlet end towards the inlet end, where the washcoat covers 50% of the length of the substrate. The amount of the ammonia oxidation catalyst is as described below.

| Example | Ammonia oxidation catalyst |
|---|---|
| a | 12% $SiO_2$ - $TiO_2$ - 0.94 g/in$^3$, Boehmite alumina - 0.06 g/in$^3$ |
| b | Pt-nitrate - 3 g/ft$^3$ |
| c | FER zeolite - 0.5 g/in$^3$, Pt-nitrate - 3 g/ft$^3$ |
| d | Fe-BEA zeolite - 0.5 g/in$^3$ |

The layer is then dried at an elevated temperature.

A layer comprising a DOC is then placed over a portion of the layer comprising the ammonia oxidation catalyst by placing a washcoat containing one of the DOCs below over layer comprising the ammonia oxidation from the outlet end towards the inlet end.

| Example | DOC catalyst |
|---|---|
| e | Pt - 3 g/ft$^3$ |
| f | Pt & Pd - 3 g/ft$^3$ and 10 g/ft$^3$ |

The layer is then dried at an elevated temperature.

A layer comprising an SCR catalyst is then placed over the remaining uncoated portion of the substrate and the uncoated portion of the layer comprising the ammonia oxidation catalyst by placing a washcoat containing 3.3 wt. % Cu/CHA at a loading of 2.07 g/in$^3$ on the substrate from the inlet end towards the outlet end. The washcoat is then dried at an elevated temperature, and then calcined.

The resulting article has three zones: an SCR zone comprising the 1$^{st}$ SCR catalyst, followed by an ASC zone comprising a bi-layer with a bottom layer comprising an ammonia oxidation catalyst and a top layer comprising the first SCR catalyst, and then an oxidation zone comprising a bi-layer with a bottom layer comprising an ammonia oxidation catalyst and a top layer comprising the DOC.

Example 2

A catalytic article is prepared by forming a first layer comprising a mixture of an ammonia oxidation catalyst and a DOC by placing a washcoat containing one of the ammonia oxidation catalysts shown in Example 1 with a DOC described in Example 1 on an extruded honeycomb substrate from the outlet end towards the inlet end, where the washcoat covers 50% of the length of the substrate. The layer is then dried at an elevated temperature. A second layer comprising the mixture of the ammonia oxidation catalyst and the DOC is then formed by the washcoat comprising the mixture of the ammonia oxidation catalyst and the DOC over a portion, but not all, of the first layer. The results in the formation of the mixture of an ammonia oxidation catalyst and a DOC into a two-step structure, where the second step, located closest to the outlet, is thicker than the first step. The layer is then dried at an elevated temperature.

A layer comprising an SCR catalyst is then placed over the remaining uncoated portion of the substrate and the uncoated portion of the layer comprising the ammonia oxidation catalyst by placing a washcoat containing 3.3 wt. % Cu/CHA at a loading of 2.07 g/in$^3$ on the substrate from the inlet end towards the outlet end. The washcoat is then dried at an elevated temperature, and then calcined as described in Example 1.

The resulting article has three zones: an SCR zone comprising the 1$^{st}$ SCR catalyst, followed by an ASC zone comprising a bi-layer with a bottom layer comprising a mixture of the ammonia oxidation catalyst and the DOC and a top layer comprising the first SCR catalyst, and then an oxidation zone comprising a mixture of the ammonia oxidation catalyst and the DOC.

Example 3

A catalytic article is prepared by forming a first layer comprising an ammonia oxidation catalyst by placing a washcoat containing one of the ammonia oxidation catalysts shown in Example 1 on an extruded honeycomb substrate from the outlet end towards the inlet end, where the washcoat covers 50% of the length of the substrate. The layer is then dried at an elevated temperature. A second layer comprising the DOC is then formed by placing a washcoat comprising the DOC over a portion, but not all, of the first layer. The layer is then dried at an elevated temperature.

A layer comprising a first SCR catalyst is then placed over the remaining uncoated portion of the substrate and the uncoated portion of the layer comprising the ammonia oxidation catalyst by placing a washcoat containing 3.3 wt. % Cu/CHA at a loading of 2.07 g/in$^3$ on the substrate from the inlet end towards the outlet end. The washcoat is placed over the layer comprising the ammonia oxidation catalyst such that a portion of the washcoat just covers the ammonia oxidation catalyst where the DOC meets the ammonia oxidation catalyst at the inlet side of the DOC. The thickness of the layer of the first SCR catalyst over the ammonia oxidation catalyst decreases from a point approximately over the inlet side end of the ammonia oxidation catalyst to where the DOC meets the ammonia oxidation catalyst at the inlet side of the DOC. The washcoat is then dried at an elevated temperature, and then calcined as described in Example 1.

A layer comprising the second SCR catalyst is formed by placing a washcoat comprising the second SCR catalyst over the DOC and a portion of the first SCR catalyst until about the location over the first SCR layer where the ammonia oxidation catalyst extends furthest towards the inlet end.

The resulting article has three zones: an SCR zone comprising the portion of the first SCR catalyst until the first SCR catalyst meets the ammonia oxidation catalyst on the substrate, followed by an ASC zone comprising a tri-layer with a bottom layer comprising the ammonia oxidation catalyst, a middle layer comprising the first SCR catalyst and a top layer comprising the second SCR catalyst.

Example 4

A catalytic article is prepared by forming a first layer comprising a mixture of an ammonia oxidation catalyst and a DOC by placing a washcoat containing one of the ammonia oxidation catalysts shown in Example 1 with a DOC described in Example 1 on an extruded honeycomb substrate from the outlet end towards the inlet end, where the washcoat covers 50% of the length of the substrate. The layer is then dried at an elevated temperature. A second layer comprising the mixture of the ammonia oxidation catalyst and the DOC is then formed by the washcoat comprising the mixture of the ammonia oxidation catalyst and the DOC over a portion, but not all, of the first layer. The results in the formation of the mixture of an ammonia oxidation catalyst and a DOC having a two-step structure, where the second step, located closest to the outlet, is thicker than the first step. The layer is then dried at an elevated temperature.

A layer comprising a first SCR catalyst is then placed over the remaining uncoated portion of the substrate and the uncoated portion of the layer comprising the mixture of the ammonia oxidation catalyst and the DOC by placing a washcoat containing 3.3 wt. % Cu/CHA at a loading of 2.07 g/in$^3$ on the substrate from the inlet end towards the outlet end. The washcoat is placed over the layer comprising the ammonia oxidation catalyst such that a portion of the washcoat just covers the first step of the mixture of the ammonia oxidation catalyst and the DOC meets the beginning of the second step of the mixture of the ammonia oxidation catalyst and the DOC. The thickness of the layer of the first SCR catalyst over the ammonia oxidation catalyst decreases from a point approximately over the inlet side end of the ammonia oxidation catalyst to where the DOC meets the ammonia oxidation catalyst at the inlet side of the DOC. The washcoat is then dried at an elevated temperature, and then calcined as described in Example 1.

A layer comprising the second SCR catalyst is formed by placing a washcoat comprising the second SCR catalyst over the mixture of the ammonia oxidation catalyst and the DOC and a portion of the first SCR catalyst until about the location over the first SCR layer where the of the mixture of the ammonia oxidation catalyst and the DOC extends furthest towards the inlet end.

The resulting article has three zones: an SCR zone comprising the portion of the first SCR catalyst until the first SCR catalyst meets the of the mixture of the ammonia oxidation catalyst and the DOC on the substrate, followed by an ASC zone comprising a tri-layer with a bottom layer comprising of the mixture of the ammonia oxidation catalyst and the DOC, a middle layer comprising the first SCR catalyst and a top layer comprising the second SCR catalyst.

Example 5

A catalytic article is prepared by forming a first layer comprising a mixture of an ammonia oxidation catalyst and a DOC by placing a washcoat containing one of the ammonia oxidation catalysts shown in Example 1 with a DOC described in Example 1 on an extruded honeycomb substrate from the outlet end towards the inlet end, where the washcoat covers 50% of the length of the substrate. The layer is then dried at an elevated temperature.

A layer comprising an SCR catalyst is then placed over the remaining uncoated portion of the substrate and a portion of, but not the entire, the first layer comprising the mixture of the ammonia oxidation catalyst and the DOC by placing a washcoat containing 3.3 wt. % Cu/CHA at a loading of 2.07 g/in$^3$ on the substrate from the inlet end towards the outlet end. The washcoat is then dried at an elevated temperature, and then calcined as described in Example 1.

The resulting article has three zones: an SCR zone comprising the 1$^{st}$ SCR catalyst, followed by an ASC zone comprising a bi-layer with a bottom layer comprising a mixture of the ammonia oxidation catalyst and the DOC and a top layer comprising the first SCR catalyst, and then an oxidation zone comprising a mixture of the ammonia oxidation catalyst and the DOC.

Example 6

A catalytic article is prepared by forming a first layer comprising a mixture of an ammonia oxidation catalyst and a DEC by placing a washcoat containing one of the ammonia oxidation catalysts shown in Example 1 with a DEC comprising Pt & Pd at a loading of 3 g/ft$^3$ and 10 g/ft$^3$, respectively, on an extruded honeycomb substrate from the outlet end towards the inlet end, where the washcoat covers 40% of the length of the substrate. The layer is then dried at an elevated temperature.

A layer comprising a first SCR catalyst is then placed over the remaining uncoated portion of the substrate up the first layer comprising the mixture of the ammonia oxidation catalyst and the DOC by placing a washcoat containing 3.3 wt. % Cu/CHA at a loading of 2.07 g/in$^3$ on the substrate from the inlet end towards the outlet end. The washcoat comprising the first SCR catalyst decreases in thickness from a maximum thickness at a point before the first layer comprising the mixture of the ammonia oxidation catalyst and the DOC to a thickness that is approximately the same as that of the first layer comprising the mixture of the ammonia oxidation catalyst and the DOC when the layer with the first SCR catalyst meets the first layer. The washcoat is then dried at an elevated temperature.

A washcoat comprising a second SCR is applied over the first layer comprising the mixture of the ammonia oxidation catalyst and the DOC and is also placed over a portion of the layer comprising the first SCR catalyst, preferably to the location where the thickness of the layer comprising the first SCR catalyst begins to decrease as it approaches the first layer comprising the mixture of the ammonia oxidation catalyst and the DOC. The second SCR catalyst can be any of the first SCR catalysts described in Example 1 and preferably further comprises Pd on alumina.

The resulting article has two zones: an SCR zone comprising the 1$^{st}$ SCR catalyst, followed by a mixed ASC/DOC zone comprising a bi-layer with a bottom layer comprising a mixture of the ammonia oxidation catalyst and the DOC or DEC and a top layer comprising the second SCR catalyst.

Example 7

A catalytic article is prepared by forming a first layer comprising a mixture of an ammonia oxidation catalyst and a DEC by placing a washcoat containing one of the ammonia oxidation catalysts shown in Example 1 with a DEC comprising Pt & Pd at a loading of 3 g/ft$^3$ and 10 g/ft$^3$, respectively, on an extruded honeycomb substrate from the outlet end towards the inlet end, where the washcoat covers 40% of the length of the substrate. The layer is then dried at an elevated temperature.

A layer comprising a first SCR catalyst is then placed over the remaining uncoated portion of the substrate and completely covers the first layer comprising the mixture of the ammonia oxidation catalyst and the DEC by placing a washcoat containing 3.3 wt. % Cu/CHA at a loading of 2.07 g/in$^3$ on the substrate from the inlet end towards the outlet end. The washcoat comprising the first SCR catalyst decreases in thickness when it covers the first layer comprising the mixture of the ammonia oxidation catalyst and the DEC. The washcoat is then dried at an elevated temperature.

The resulting article has two zones: an SCR zone comprising the 1$^{st}$ SCR catalyst, followed by a mixed ASC/DOC zone comprising a bi-layer with a bottom layer comprising a mixture of the ammonia oxidation catalyst and the DEC and a top layer comprising the first SCR catalyst.

Layers comprising a mixture of an ammonia oxidation catalyst and a DOC or DEC can comprise a mixture of Pt and Pd as the DOC, where Pt and Pd are present in the washcoats as the nitrates of each of the metals and the metal nitrates are present in a loading of Pt-nitrate 3 g/ft$^3$ and Pd-nitrate 15 g/ft$^3$, or Pt-nitrate 12 g/ft$^3$, Pd-nitrate 6 g/ft$^3$.

Example 8

Ammonia Uptake by Catalysts

Three SCR catalysts were analyzed to determine the amount of NOx conversion versus the ammonia fill level. The three SCR catalysts were a metal zeolite (Cu-CHA), a mixed oxide (Ce—Zr (1:1)) and vanadium on a W-doped titania dioxide.

Samples of the metal zeolite were prepared by placing a washcoat comprising 3.3 wt. % Cu on chabazite on a 400 cpsi ceramic substrate. The loading of chabazite on the support was 2 g/in$^3$. Samples of vanadium were prepared by placing a washcoat comprising W-doped titanium oxide with a vanadia active phase on a 400 cpsi ceramic substrate. The loading of W-doped titanium oxide with a vanadia on the support was 4.86 g/in$^3$. Samples of the mixed oxide were prepared by extruding a mixture of Ce and Zr in a 1:1 molar ratio. The metal oxide was 55% of the total extrudate. The cores were calcined and a 1"×3" core from each of the catalysts was used to evaluate the ammonia uptake of the catalyst.

A sample of a 1"×3" catalyst core was held at steady state at 250° C. with a gas containing 500 ppm NO, 12% $O_2$, 5% $CO_2$, 300 ppm CO, 4.5% $H_2O$ and the remainder nitrogen, flowing over the sample at 60K SV. 750 ppm $NH_3$ was introduced to the gas stream, and the gas leaving the system was analyzed by FTIR until there was 20 ppm $NH_3$ slip. The $NH_3$ fill level was calculated using the equation:

Net $NH_3$ uptake=[$NH_3$inlet]−[$NH_3$slip]−[$NH_3$reacted (NOx+2*$N_2$O)]

Figure 10:
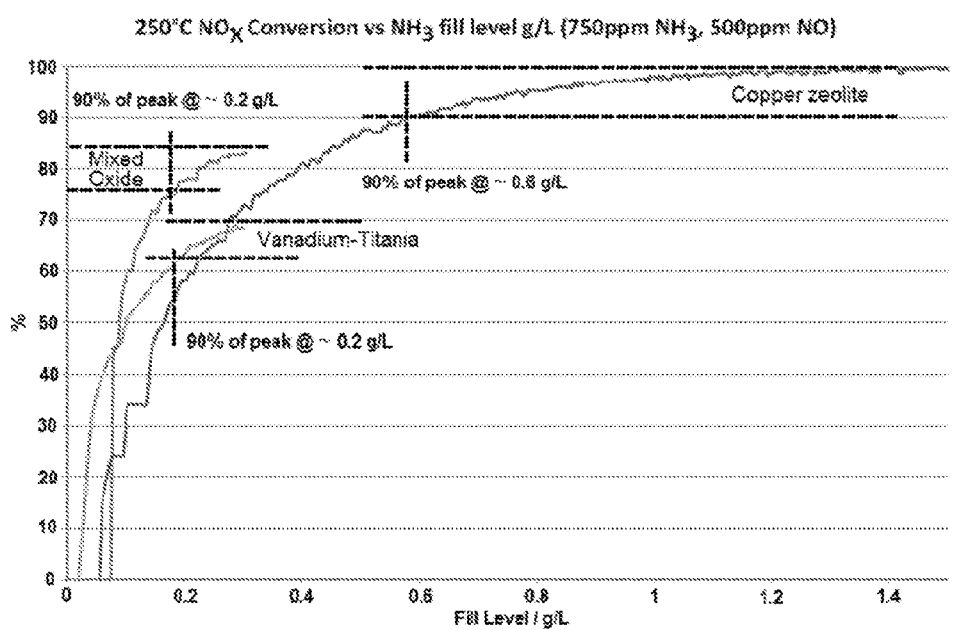
FIG. 10 is a graph showing the amount of NOx conversion versus the ammonia fill level for three types of SCR catalysts.
Figure 11:
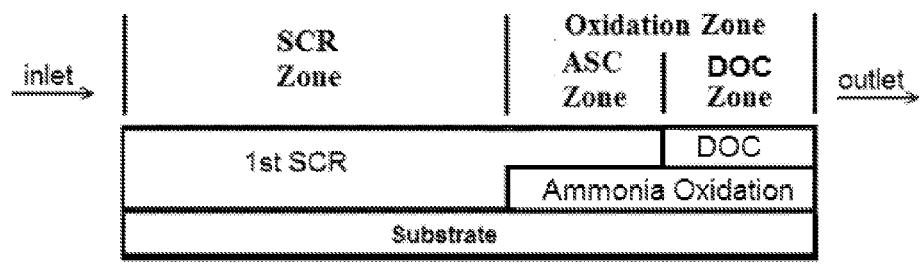
FIG. 11 depicts a configuration in which a first SCR catalyst is positioned in the exhaust gas flow before an ammonia oxidation catalyst and covers a portion of, but not the entire length of, the ammonia oxidation catalyst. A DOC is positioned over the remaining top portion of the ammonia oxidation catalyst not covered by the first SCR catalyst.

The results are shown in FIG. 10 along with the peak fill, the level at 90% of the peak fill and the amount of time needed to reach 90% of the peak fill. The copper zeolite had 90% of its peak fill at about 0.6 g/L, while both the mixed oxide and the vanadium-titania had their peak fill at about 0.2 g/L. This demonstrates that some SCR catalysts have a fast transient response compared to other SCR catalysts. As described above, this property can be used in the catalyst articles described above.

The preceding examples are intended only as illustrations; the following claims define the scope of the invention.

The invention claimed is:
1. A catalytic article comprising
   (a) a flow-through substrate having an inlet, an outlet, and an axial length;
   (b) an SCR zone having a first SCR catalyst and being positioned on the substrate from the inlet to less than the axial length of the substrate; and

(c) an oxidation zone comprising a PGM-containing ammonia oxidation catalyst and a PGM-containing DOC catalyst,
wherein the PGM-containing ammonia oxidation catalyst and the PGM-containing DOC catalyst are arranged in:
(i) an ASC zone and a separate DOC zone or
(ii) a mixed ASC and DOC zone,
wherein the DOC zone or the mixed ASC and DOC zone is positioned on the substrate from the outlet end to less than the axial length of the substrate, and
when the separate DOC zone is present, the ASC zone is located between the SCR zone and the DOC zone,
provided that the concentration (grams per cubic liter) of PGM in the DOC catalyst is greater than the concentration of PGM in the ammonia oxidation catalyst.

2. The catalytic article of claim 1, wherein the first SCR catalyst overlaps a portion of the ASC zone or a mixed ASC/DOC zone.

3. The catalytic article of claim 1, wherein the PGM-containing ammonia oxidation catalyst and the PGM-containing DOC catalyst are arranged in an ASC zone and a separate DOC zone and
(a) the ASC zone comprises a bottom layer comprising an ammonia oxidation catalyst and a top layer comprising the first SCR catalyst, where the first SCR catalyst covers the entire portion of the ammonia oxidation catalyst in the ASC zone, and
(b) the DOC zone comprises a bottom layer comprising an ammonia oxidation catalyst and a top layer comprising the DOC catalyst, wherein the DOC catalyst covers the entire portion of the ammonia oxidation catalyst in the DOC zone.

4. The catalytic article of claim 1, wherein the ASC zone comprises a bottom layer comprising a mixture of an ammonia oxidation catalyst and a DOC catalyst, and a portion of the first SCR catalyst also forms a top layer that covers the entire portion of the mixture of the ammonia oxidation catalyst and the DOC catalyst in the ASC zone, and the DOC zone comprises a mixture of an ammonia oxidation catalyst and a DOC catalyst, wherein the mixture is located on the substrate in the ASC zone and the DOC zone.

5. The catalytic article of claim 1, wherein the ASC zone comprises a bottom layer comprising a mixture of an ammonia oxidation catalyst and a DOC catalyst, where the bottom layer is located on the substrate, and a portion of the first SCR catalyst forms a top layer that covers the entire portion of the bottom layer in the ASC zone, and the DOC zone comprises a mixture of an ammonia oxidation catalyst and a DOC catalyst, wherein here the mixture of an ammonia oxidation catalyst and a DOC catalyst in the DOC zone is located on the substrate.

6. The catalytic article of claim 1, wherein the oxidation zone comprises a mixed ASC/DOC zone comprising a bottom layer comprising a mixture of an ammonia oxidation catalyst and a DOC catalyst, and a top layer comprising the first SCR catalyst, wherein the top layer covers the entire bottom layer, and the bottom layer is located on the substrate.

7. The catalytic article of claim 1, further comprising a second SCR catalyst, wherein the second SCR catalyst covers a portion of the first SCR catalyst and the second SCR catalyst is the same as, or different than, the first SCR catalyst.

8. The catalytic article of claim 7, wherein the second SCR catalyst comprises a different active catalyst than the first SCR catalyst.

9. The catalyst article of claim 7, wherein the ASC zone comprises the first SCR catalyst, the second SCR catalyst and an ammonia oxidation catalyst.

10. The catalytic article of claim 7, wherein the ASC zone comprises a bottom layer comprising an ammonia oxidation catalyst, a middle layer comprising the first SCR catalyst, and a third layer comprising the second SCR catalyst.

11. The catalytic article of claim 7, wherein the ASC zone comprises a bottom layer comprising a mixture of an ammonia oxidation catalyst and a DOC catalyst, a middle layer comprising the first oxidation catalyst, and a third layer comprising the second SCR catalyst.

12. The catalytic article of claim 7, wherein the SCR zone comprises the first SCR catalyst and the second SCR catalyst and the second SCR catalyst overlaps a portion of the first SCR catalyst in the SCR zone, and the mixed ASC/DOC zone comprises a bottom layer comprising a mixture of an ammonia oxidation catalyst and a DOC catalyst, wherein the bottom layer is located on the substrate, and a top layer comprising the second SCR catalyst that covers the entire portion of the bottom layer in the mixed ASC/DOC zone.

13. The catalytic article of claim 1, further comprising a second SCR catalyst, wherein the first SCR catalyst covers a portion of the second SCR catalyst and the second SCR catalyst is the same as, or different than, the first SCR catalyst.

14. The catalytic article of claim 13, wherein the second SCR catalyst has a different loading than the first SCR catalyst.

15. The catalytic article of claim 1, wherein the ASC comprises a bi-layer with a lower layer comprising an ammonia oxidation catalyst and an upper layer, comprising an SCR catalyst.

16. An exhaust system comprising the catalytic article of claim 1 and a means for forming $NH_3$ in the exhaust gas or introducing $NH_3$ into the exhaust gas.

17. A method of providing low temperature NOx control coupled with good ASC selectivity and DOC capability in the exhaust from a diesel engine, the method comprising contacting an exhaust gas from the engine with a catalyst article of claim 1.

* * * * *